United States Patent
Zhou et al.

(10) Patent No.: US 9,621,331 B2
(45) Date of Patent: Apr. 11, 2017

(54) ADAPTIVE OFFSET SYNCHRONIZATION OF DATA BASED ON RING BUFFERS

(75) Inventors: Mindong Zhou, Shanghai (CN); Guangning Fu, Shanghai (CN); Wenjia Wu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 14/399,932

(22) PCT Filed: Jun. 18, 2012

(86) PCT No.: PCT/CN2012/077071
§ 371 (c)(1),
(2), (4) Date: Nov. 7, 2014

(87) PCT Pub. No.: WO2013/189009
PCT Pub. Date: Dec. 27, 2013

(65) Prior Publication Data
US 2015/0124841 A1    May 7, 2015

(51) Int. Cl.
*H04J 3/06*     (2006.01)
*H04L 7/00*     (2006.01)
*G06F 13/38*    (2006.01)
*H04L 25/49*    (2006.01)

(52) U.S. Cl.
CPC .......... *H04L 7/0016* (2013.01); *G06F 13/385* (2013.01); *H04L 25/4927* (2013.01)

(58) Field of Classification Search
USPC ....................................................... 370/503
See application file for complete search history.

(56) References Cited

U.S. PATENT DOCUMENTS

| 6,463,069 B1 | 10/2002 | Eriksson et al. |
| 6,799,227 B2 | 9/2004 | Sathe |
| 6,977,897 B1 | 12/2005 | Nelson et al. |
| 7,242,736 B2 | 7/2007 | Schanke et al. |

(Continued)

FOREIGN PATENT DOCUMENTS

| CN | 101212490 A | 7/2008 |
| CN | 101296217 A | 10/2008 |

(Continued)

OTHER PUBLICATIONS

Supplementary European Search Report—EP12879587—Search Authority—Munich—Nov. 30, 2015.

(Continued)

*Primary Examiner* — Phuongchau Ba Nguyen
(74) *Attorney, Agent, or Firm* — Paradice and Li LLP

(57) ABSTRACT

A method and apparatus for synchronizing operations between a first circuit and a second circuit is disclosed. The method involves writing receive data from the first circuit to a first ring buffer at a first rate. The first ring buffer has a fixed-length of buffer elements and respective read and write buffer pointers. The buffered receive data is read from the first ring buffer to the second circuit at a second data rate. The respective positions of the read and write buffer pointers are detected, and a relative position between the read and write pointers is dynamically adjusted to enforce at least a predetermined minimum spacing. The dynamic adjustment comprises selectively adding or deleting portions of the data to or from the ring buffer.

12 Claims, 3 Drawing Sheets

(56) References Cited

U.S. PATENT DOCUMENTS

| | | |
|---|---|---|
| 2005/0058148 A1 | 3/2005 | Castellano et al. |
| 2008/0043276 A1 | 2/2008 | Escott |
| 2010/0174877 A1 | 7/2010 | Yagihashi |
| 2011/0019089 A1 | 1/2011 | Bridges et al. |

FOREIGN PATENT DOCUMENTS

| | | |
|---|---|---|
| CN | 101930416 A | 12/2010 |
| EP | 1895705 A2 | 3/2008 |
| JP | S61191134 A | 8/1986 |
| JP | H0458646 A | 2/1992 |
| JP | 2003274216 A | 9/2003 |
| JP | 2008048392 A | 2/2008 |
| JP | 2012090170 A | 5/2012 |
| JP | 2012100092 A | 5/2012 |

OTHER PUBLICATIONS

International Search Report and Written Opinion—PCT/CN2012/077071—ISA/EPO—Mar. 28, 2013.

ADAPTIVE OFFSET SYNCHRONIZATION OF DATA BASED ON RING BUFFERS

TECHNICAL FIELD

The present embodiments relate generally to data communications, and more particularly to methods and apparatus that provide flow control for buffering data.

BACKGROUND OF RELATED ART

Data transfers between circuits often become unsynchronized due to many factors. For example, in voice-over-IP (VOIP) applications, the analog-to-digital codecs (such as a pulse-code-modulation PCM codec) may generate data at a rate different than the rate at which a signal processor can accept it. Buffer circuits typically provide a dynamic way to absorb and handle the ebb and flow of data being communicated between such circuits.

One typical buffering solution employs ring or circular buffers that have a fixed number of buffer elements. Respective read and write pointers or indices track the available buffer storage capacity. In some circumstances, the buffer may become full, causing an overwrite of the oldest data in the buffer. The indices identify this state by both pointing to the same buffer element location. When data is lost due to overwrites, noise in the system may result.

To minimize overwrites, large buffer configurations may be employed. The large buffers may be able to handle the various delays in operation between, for example, a PCM controller and a digital signal processor (DSP). Unfortunately, employing large buffers causes a corresponding increase in system latency and circuit space.

SUMMARY

A method of synchronizing operations between a first circuit and a second circuit is disclosed. The method involves receiving data at a first data rate, and buffering the data. The buffering is handled by a buffer circuit having a fixed length of buffer elements and respective read and write buffer indicators. The buffered data is delivered to the second circuit at a second data rate. The second data rate is based on a minimum offset enforced between the read and write buffer indicators. Enforcement of the offset is handled by detecting the respective locations of the read and write buffer indicators, and dynamically adjusting a relative spacing between the indicators to maintain at least the minimum offset.

BRIEF DESCRIPTION OF THE DRAWINGS

The present embodiments are illustrated by way of example and are not intended to be limited by the figures of the accompanying drawings, where.

DETAILED DESCRIPTION

In accordance with the present embodiments, a method and apparatus for synchronizing operations between a first circuit and a second circuit is disclosed. The method involves writing receive data from the first circuit to a first ring buffer at a first rate. The buffer has a fixed-length of buffer elements and respective read and write buffer indicators. The buffered receive data is read from the ring buffer to the second circuit at a second data rate. The respective positions of the read and write buffer indicators are detected, and a relative position between the indicators is dynamically adjusted to enforce at least a predetermined minimum spacing. The dynamic adjustment comprises selectively adding or deleting portions of the data to or from the ring buffer. As a result, overwrites to buffered data may be minimized while also optimizing system latency.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
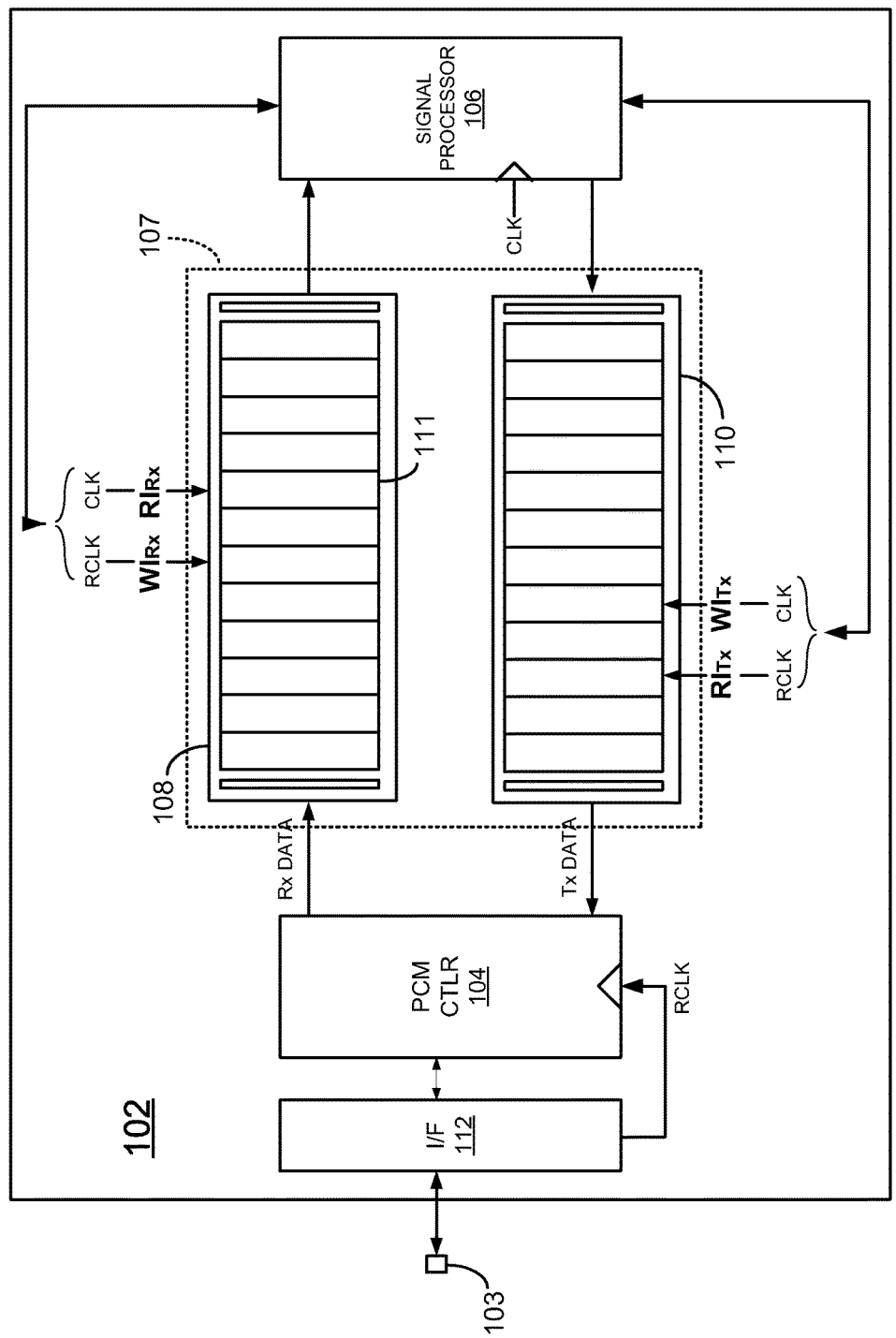
FIG. 1 is a block diagram of one embodiment of a system that employs a buffer circuit to provide adaptive offset synchronization of data.

More specifically, and referring generally to FIG. 1, an integrated circuit (IC) device 102 for carrying out signal processing operations is shown. In one specific embodiment, the signal processing involves Voice-Over-Internet-Protocol (VOIP) communications. VOIP communications generally involve capturing analog audio signals, digitizing and encoding the audio signals, and processing the digitized audio in a manner suitable for transmission via the Internet. A conversation via VOIP thus involves bidirectional communication between two remote points, and the round-trip latency associated with the communications. In one specific embodiment, to carry out VOIP processing, the IC device 102 employs a pulse code modulation (PCM) controller 104 that interacts with a signal processor 106 such as a digital signal processor (DSP) via a buffer circuit 107.

Further referring to FIG. 1, in one specific embodiment, the integrated circuit device 102 receives audio data at one or more pins 103 which are coupled to a data I/O interface circuit (I/F) 112. The interface circuit 112 generally includes transmit and receive circuitry (not shown) that allows the IC device 102 to interface with various physical transmission media. While only one pin 103 is shown for purposes of clarity, it should be understood that plural interface pins may be employed to transfer data in a parallel or serial scheme. In one embodiment, timing information accompanies the received audio data to form a timing reference in the form of a recovered clock signal RCLK. Further, while a wired data interface for the IC is shown and described, a wireless interface may also be employed, and in such circumstances, the interface would include appropriate RF modulation circuitry and associated antenna circuitry.

The interface 112 couples to the PCM controller 104 to affect an analog-to-digital conversion of received audio signals, and digital-to-analog conversion of signals processed by and transmitted from the signal processor 106. A PCM controller is but one way of encoding the audio signals, and a variety of different encoding algorithms may be employed. Respective analog-to-digital (ADC) and digital-to-analog (DAC) converters (not shown) carry out the signal conversion as is well-known to those skilled in the art. The PCM controller 104 generally operates at a consistent data rate with respect to the recovered clock signal RCLK and carries out analog-digital and digital-analog conversions of receive Rx and transmit Tx data transferred via the interface 112. While the PCM controller 104 is shown and described as disposed on the IC device 102, it may reside on a separate IC device and packaged together or separate from the signal processor 106.

The signal processor 106 may take one of several forms, including a dedicated digital signal processor (DSP) or host-based soft-DSP. The signal processor 106 may be clocked by a local clock signal CLK generated by an on-chip clock (not shown) and operates at a rate similar to that of the PCM controller 104. However, due to occasional priority conflicts, the signal processor 106 may not be able to synchronize with the PCM controller 104.

Further referring to FIG. 1, the buffer circuit 107 is disposed between the PCM controller 104 and the signal processor 106 to handle mismatches in data rates there between. In one embodiment, the buffer circuit 107 includes respective receive and transmit buffers 108 and 110 that take the form of ring buffers. Each ring buffer may include a fixed number of buffer storage cells 111 and respective read and write indices or pointers. The receive buffer 108 thus employs a receive read pointer $RI_{R_x}$ and a receive write pointer $WI_{R_x}$, and the transmit buffer 110 employs a transmit read pointer $RI_{T_x}$ and a transmit write pointer $WI_{T_x}$.

For the receive buffer 108, the receive read pointer $RI_{R_x}$ indicates through its pointer position how much data has been delivered to the signal processor 106. This indication of position may take the form of a count that represents the address of a buffer storage cell 111 that will be read in the next read operation. In one embodiment, the receive read pointer $RI_{R_x}$ responds to the local clock signal CLK as its timing reference for read operations. In other words, the receive read pointer $RI_{R_x}$ increments to its next cell location for reading the contents of that cell every clock cycle, using the local clock CLK as its timing reference.

The receive write pointer $WI_{R_x}$ for the receive buffer 108, on the other hand, utilizes the recovered clock signal RCLK as its timing signal, and indicates through a count value similar to the receive read pointer $RI_{R_x}$ how much data has been loaded into the receive buffer 108. When the read and write pointers indicate respective positions at the same receive buffer storage cell, the amount of data written into the buffer matches the amount of data read from the buffer, thus indicating a full buffer. As a result, any further write operations without further buffer capacity will overwrite existing data.

The timing references for clocking the read and write indices of the receive and transmit buffers 108 and 110 are configured between the recovered and local clocks RCLK and CLK in a manner that maximizes data quality and synchronization between the PCM controller 104 and the signal processor 106. To this end, the receive write pointer $WI_{R_x}$ for the receive buffer 108 and the transmit read pointer $RI_{T_x}$ for the transmit buffer 110 are clocked by the recovered clock RCLK, while the receive read pointer $RI_{R_x}$ for the receive buffer 108 and the transmit write pointer $WI_{T_x}$ for the transmit buffer 110 are clocked by the local clock CLK.

In an effort to avoid overwrites and yet minimize the buffer size and latency, in one embodiment the signal processor 106 operates in a mode that monitors and detects the relative spacing between the read and write pointers of each ring buffer. Based on the detecting, the signal processor 106 enforces a minimum spacing between the read and write pointers to minimize occurrences where the buffer overwrites existing data. The "spacing" thus represents the number of read/write cycles worth of asynchronous operation that can be absorbed by the buffer circuit 107 before overwrites occur.

The signal processor 106 also operates in a second mode that detects undesirable latency between the PCM controller 104 and the signal processor 106 that may significantly impact the quality of service between audio transmissions. In response, the signal processor 106 adaptively adjusts the spacing between the transmit buffer read and write pointers RITx and WITx to match the latency of the signal processor 106. This is carried out even if data may be lost through the adjustment. Thus, not only may overwrites be avoided, but an optimum level of synchronization between the PCM controller 104 and the signal processor 106 may be attained.

Figure 2:
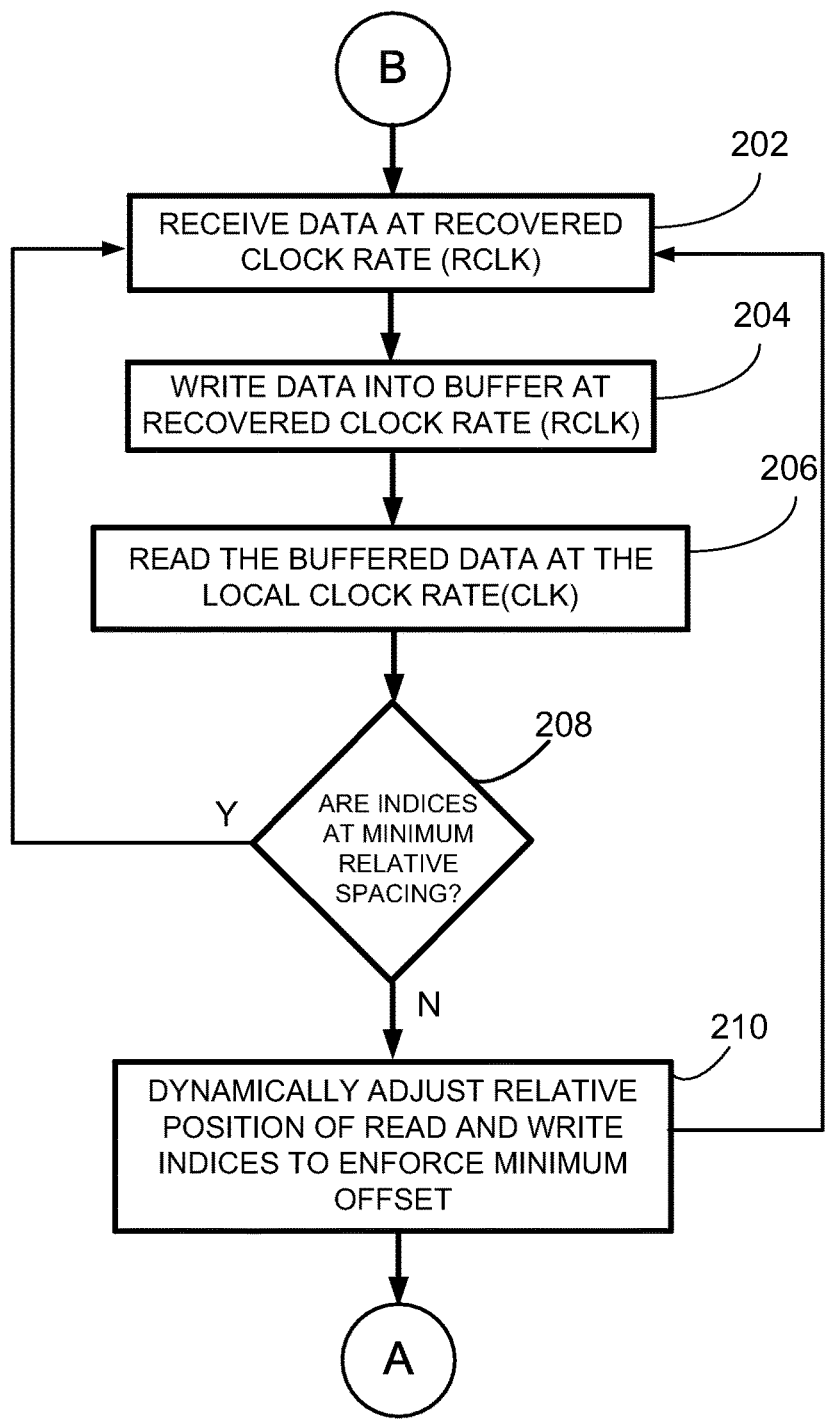
FIG. 2 is a flowchart illustrating steps involved in one mode of operation for the system of FIG. 1.

FIG. 2 illustrates a flowchart of steps that sets out a method of operation corresponding to the first mode of operation alluded to above. During a VOIP communication, audio data is received by the IC device 102 at the interface 112 and fed to the PCM controller 104 for PCM encoding at the rate corresponding to the clock signal RCLK recovered from the received audio data, at step 202. The PCM encoded data is then written into the receive buffer 108 at positions indicated by the receive write pointer WIRx at a rate dictated by the recovered clock RCLK, at step 204. Previously written buffered data is then read from the receive buffer 108 into the signal processor 106 at the local clock rate CLK, at step 206. The signal processor 106 enforces a minimum spacing between the write and read pointers by first determining whether the pointers in-fact exhibit the minimum spacing (through a comparison of the write and read pointer counts, or the like), at step 208. If the counts reflect a proper minimum spacing, then further data is cycled through the buffer, beginning with step 202. However, if the counts reflect a smaller offset than the desired threshold, the pointers are adjusted in relation to each other to achieve the offset, at step 210. At this point, the method may iterate back to the data receive step at 202, or engage in a further mode (via bubble "A") that addresses latency between the PCM controller 104 and the signal processor 106.

Figure 3:
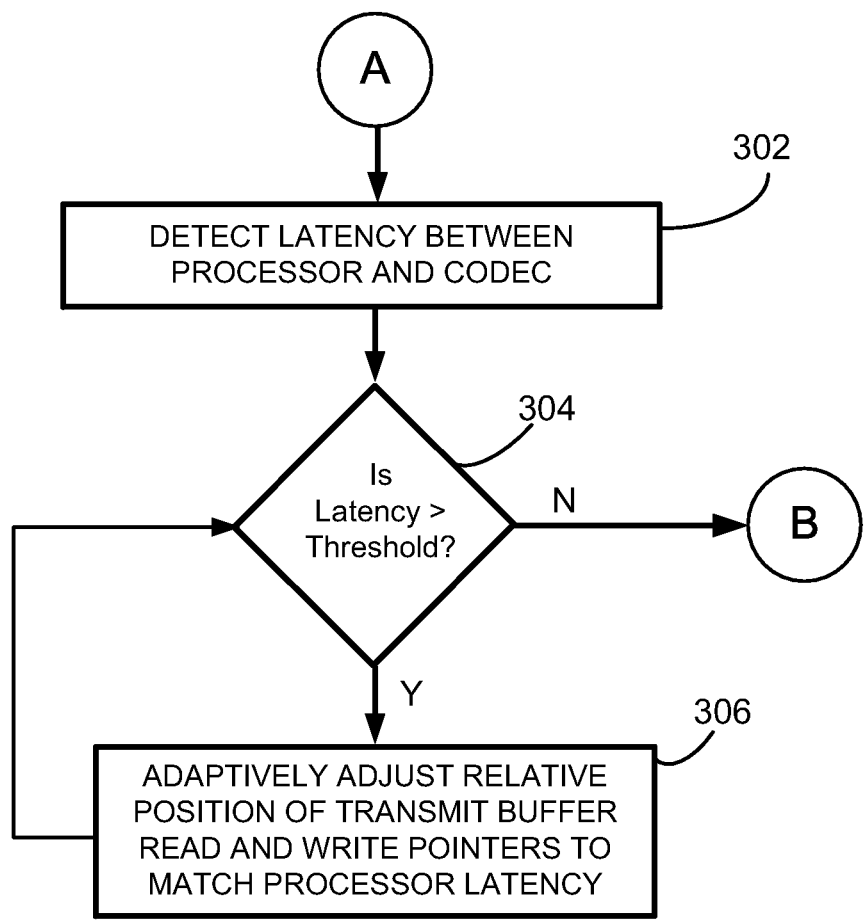
FIG. 3 illustrates a flowchart that shows steps involved in a second mode of operation for the system of FIG. 1.

Referring now to FIG. 3, undesirable latency between the PCM controller 104 and the signal processor 106 may be compensated by detecting the latency or delay in operations between the circuits, at 302, and determining whether a latency threshold is exceeded, at step 304. Extreme latencies may cause significant quality issues over and above periodic lost data problems caused, for example, by buffer overwrites. If the latency threshold is within limits, then operation resumes with the data receive step 202 of FIG. 2 (via bubble "B").

However, if the latency threshold is exceeded, at step 304, the relative position of the transmit buffer read and write pointers is adaptively adjusted to match the processor latency, at step 306. In one embodiment this is carried out by adjusting the position of the transmit write pointer $WI_{T_x}$ in an iterative manner until the latency falls within limits. In some instances, this may cause a temporary data loss of the data residing in the buffer cell location(s) eliminated due to the adaptive adjustment of the transmit write pointer $WI_{T_x}$. While losing data is contrary to conventional wisdom, this has been determined to be more beneficial for optimal quality of service than keeping the data and tolerating the latency.

Those skilled in the art will appreciate the benefits and advantages afforded by the embodiments described herein. By providing a first mode of operation capable of enforcing a minimal read and write pointer offset, loss of data due to buffer overwrites may be minimized. By also providing a second mode of operation to adaptively adjust transmit pointers based on latency considerations, an optimal quality of service may be attained.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. For example, much of the description provided herein relates to audio data synchronization in a VOIP context. However, a variety of applications may benefit from the teachings herein, including video-based data applications, basic networking data transfer applications, and the like. The specification and drawings are, accordingly, to be regarded in an illustrative sense rather than a restrictive sense.

What is claimed is:

1. A method comprising:
  writing data by a first circuit to a first position in a first ring buffer at a first rate;
  reading data by a second circuit from a second position in the first ring buffer at a second rate;
  writing data by the second circuit to a first position in a second ring buffer at the second rate;
  reading data by the first circuit from a second position in the second ring buffer at the first rate;
  detecting by the second circuit the first position and the second position in the first ring buffer;
  dynamically adjusting at least one from the group consisting of the first position and the second position in the first ring buffer to protect a predetermined minimum spacing for the first ring buffer; and
  dynamically adjusting at least one from the group consisting of the first position and the second position in the second ring buffer to protect a predetermined minimum spacing for the second ring buffer based on a threshold of delay between a transmit write pointer and a transmit read pointer, wherein:
    the first position in the second ring buffer is associated with a transmit write pointer, and
    the second position in the second ring buffer is associated with a transmit read pointer.

2. The method of claim 1, wherein dynamically adjusting at least one from the group consisting of the first position and the second position in the second ring buffer is to compensate for a latency between the first circuit and the second circuit.

3. The method of claim 2 wherein the first rate corresponds to a first timing reference associated with the first circuit, and the second rate corresponds to a second timing reference associated with the first second circuit.

4. The method of claim 3 wherein a phase difference between the first and second timing references corresponds to the latency.

5. The method of claim 3, wherein the first timing reference comprises a clock rate determined by the first circuit from the data to be written by the first circuit to the first ring buffer, and the second timing reference comprises a local clock that clocks the second circuit.

6. The method of claim 1, further comprising:
  receiving audio information at the first circuit;
  recovering from the received audio information a clock rate of the received audio information, wherein the clock rate corresponds to the first rate; and
  converting the received audio information to the data to be written to the first ring buffer.

7. The method of claim 6, further comprising using a clock to operate the second circuit at the second rate.

8. An integrated circuit device comprising:
  a first circuit responsive to a first timing reference;
  a second circuit responsive to a second timing reference; and
  a buffer circuit including:
    a receive ring buffer configured to receive data from the first circuit in response to a receive write pointer and deliver data to the second circuit in response to a receive read pointer, wherein:
      the receive write pointer indicates a first position in the receive ring buffer and is synchronized to the first timing reference, and
      the receive read pointer indicates a second position in the receive ring buffer and is synchronized to the second timing reference; and
    a transmit ring buffer configured to receive data from the second circuit in response to a transmit write pointer and deliver data to the first circuit in response to a transmit read pointer, wherein:
      the transmit write pointer indicates a first position in the transmit ring buffer and is synchronized to the second timing reference, and
      the transmit read pointer indicates a second position in the transmit ring buffer and is synchronized to the first timing reference;
    wherein the second circuit is configured to adjust at least one from the group consisting of the first position and the second position in the transmit ring buffer to protect a predetermined minimum spacing for the transmit ring buffer based on a threshold of delay between the transmit write pointer and the transmit read pointer.

9. The integrated circuit device of claim 8, wherein adjusting at least one from the group consisting of the first position and the second position in the transmit ring buffer is to compensate for a latency between the first circuit and the second circuit.

10. The integrated circuit device of claim 8, wherein the first circuit comprises an analog-to-digital converter (ADC).

11. The integrated circuit device of claim 10, wherein the ADC is a pulse code modulation (PCM) controller and the first circuit further comprises an interface coupled to the PCM controller, the interface configured to:
  receive audio information;
  recover from the received audio information a clock rate of the received audio information, wherein the clock rate corresponds to the first timing reference; and
  convert the received audio information to the data to be written to the receive ring buffer.

12. The integrated circuit device of claim 8, wherein the second circuit is a digital signal processor.

* * * * *